United States Patent
Nakaoka

(10) Patent No.: US 12,293,665 B2
(45) Date of Patent: May 6, 2025

(54) WIRELESS COMMUNICATION DEVICE AND DRIVING ASSISTANCE DEVICE

(71) Applicant: Panasonic Intellectual Property Management Co., Ltd., Osaka (JP)

(72) Inventor: Ken Nakaoka, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 180 days.

(21) Appl. No.: 18/101,862

(22) Filed: Jan. 26, 2023

(65) Prior Publication Data

US 2023/0306848 A1 Sep. 28, 2023

(30) Foreign Application Priority Data

Mar. 24, 2022 (JP) .................................. 2022-049069

(51) Int. Cl.
*G08G 1/16* (2006.01)
*B60W 50/14* (2020.01)
(Continued)

(52) U.S. Cl.
CPC ............. *G08G 1/161* (2013.01); *B60W 50/14* (2013.01); *B62J 45/412* (2020.02); *B62J 45/4151* (2020.02); *G08G 1/166* (2013.01); *H04W 4/025* (2013.01); *H04W 4/46* (2018.02); *H04W 4/90* (2018.02); *B60W 2050/143* (2013.01); *B60W 2050/146* (2013.01); *B60W 2556/65* (2020.02)

(58) Field of Classification Search
CPC ....... G08G 1/161; G08G 1/166; B60W 50/14; B60W 2050/143; B60W 2050/146; B60W 2556/65; B62J 45/412; B62J 45/4151; B62J 27/00; B62J 45/41; H04W 4/025; H04W 4/46; H04W 4/90
See application file for complete search history.

(56) References Cited

U.S. PATENT DOCUMENTS

2015/0336508 A1 11/2015 Chiba et al.
2019/0271543 A1* 9/2019 Serita ....................... B60L 15/20
(Continued)

FOREIGN PATENT DOCUMENTS

JP 2009-223640 A 10/2009
JP 2015-075967 A 4/2015
(Continued)

OTHER PUBLICATIONS

Office Action issued in family member Japanese Patent Application No. 2022-049069, dated Jan. 30, 2024, together with an English translation.

*Primary Examiner* — Rodney A Butler
(74) *Attorney, Agent, or Firm* — GREENBLUM & BERNSTEIN, P.L.C.

(57) ABSTRACT

A wireless communication device according to the present disclosure is set to be mounted on a vehicle including at least one wheel. The wireless communication device includes an input circuit, and an output circuit. The input circuit is set to connect to a lean angle detection circuit capable of detecting a lean angle of the vehicle with a traveling direction of the vehicle as a rotation axis. The output circuit is configured to repeatedly transmit a wireless signal including at least a position of the vehicle, a speed of the vehicle, and the lean angle of the vehicle at predetermined time intervals.

16 Claims, 7 Drawing Sheets

(51) Int. Cl.
*B62J 45/41* (2020.01)
*B62J 45/412* (2020.01)
*B62J 45/415* (2020.01)
*H04W 4/02* (2018.01)
*H04W 4/46* (2018.01)
*H04W 4/90* (2018.01)

(56) References Cited

U.S. PATENT DOCUMENTS

2020/0302704 A1* 9/2020 Khanna .................... B62J 45/41
2020/0398750 A1 12/2020 Aizawa et al.
2021/0378635 A1 12/2021 Kumata

FOREIGN PATENT DOCUMENTS

JP 2021-002112 A 1/2021
WO WO 2020/202358 A1 10/2020

* cited by examiner

WIRELESS COMMUNICATION DEVICE AND DRIVING ASSISTANCE DEVICE

CROSS-REFERENCE TO RELATED APPLICATIONS

This application is based upon and claims the benefit of priority from Japanese Patent Application No. 2022-049069, filed on Mar. 24, 2022, the entire contents of which are incorporated herein by reference.

FIELD

Embodiments described herein relate generally to a wireless communication device and a driving assistance device.

BACKGROUND

Conventionally, there is known a technique of detecting presence of another vehicle such as an oncoming vehicle based on information obtained by a sensor configured to monitor a surrounding characteristic such as a millimeter wave radar.

A conventional technique is disclosed in JP-A-2021-002112.

For example, on a curved road, there is a problem that a collision accident between an own vehicle and an oncoming vehicle is likely to occur when the oncoming vehicle such as a two-wheeled vehicle runs off into a traveling lane of the own vehicle.

A problem to be solved by the present disclosure is to suppress a collision accident on a curved road.

SUMMARY

A wireless communication device according to the present disclosure is set to be mounted on a vehicle including at least one wheel. The wireless communication device includes an input circuit, and an output circuit. The input circuit is set to connect to a lean angle detection circuit capable of detecting a lean angle of the vehicle with a traveling direction of the vehicle as a rotation axis. The output circuit is configured to repeatedly transmit a wireless signal including at least a position of the vehicle, a speed of the vehicle, and the lean angle of the vehicle at predetermined time intervals.

DETAILED DESCRIPTION

Figure 1:
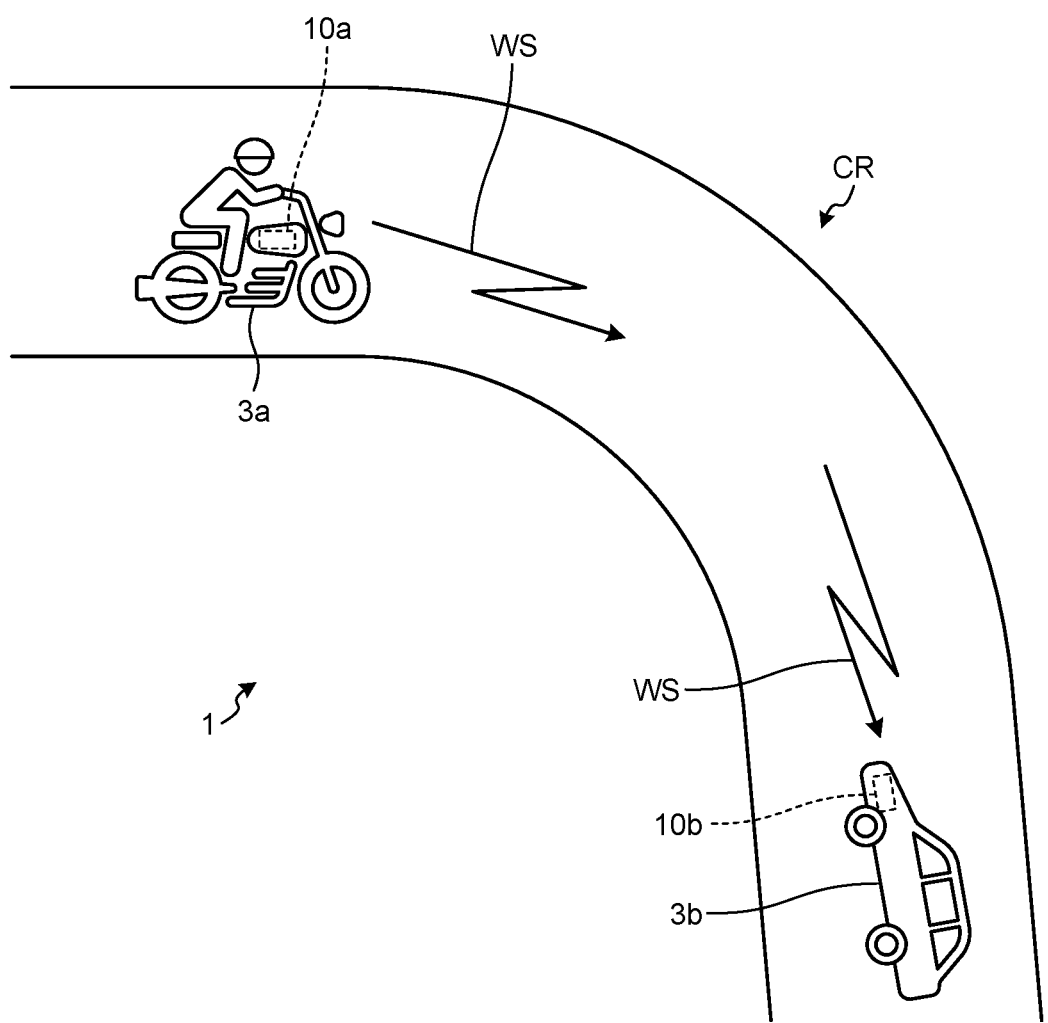
FIG. 1 is a diagram schematically illustrating an example of a driving assistance system according to an embodiment.

Hereinafter, embodiments of a wireless communication device and a driving assistance device according to the present disclosure will be described with reference to the drawings.

It is noted that, in the following description, components having the same or substantially the same functions as those already described in the previous drawings will be denoted by the same reference numerals, and redundant description will be given only when necessary. In addition, components having the same or substantially the same functions as those already described in the previous drawings may be distinguished by adding a or b to the end of the reference numerals. Alternatively, when a plurality of components having the same or substantially the same function are not distinguished, the same may be collectively described by omitting a or b added to the end of the reference numerals.

First Embodiment

Figure 2:
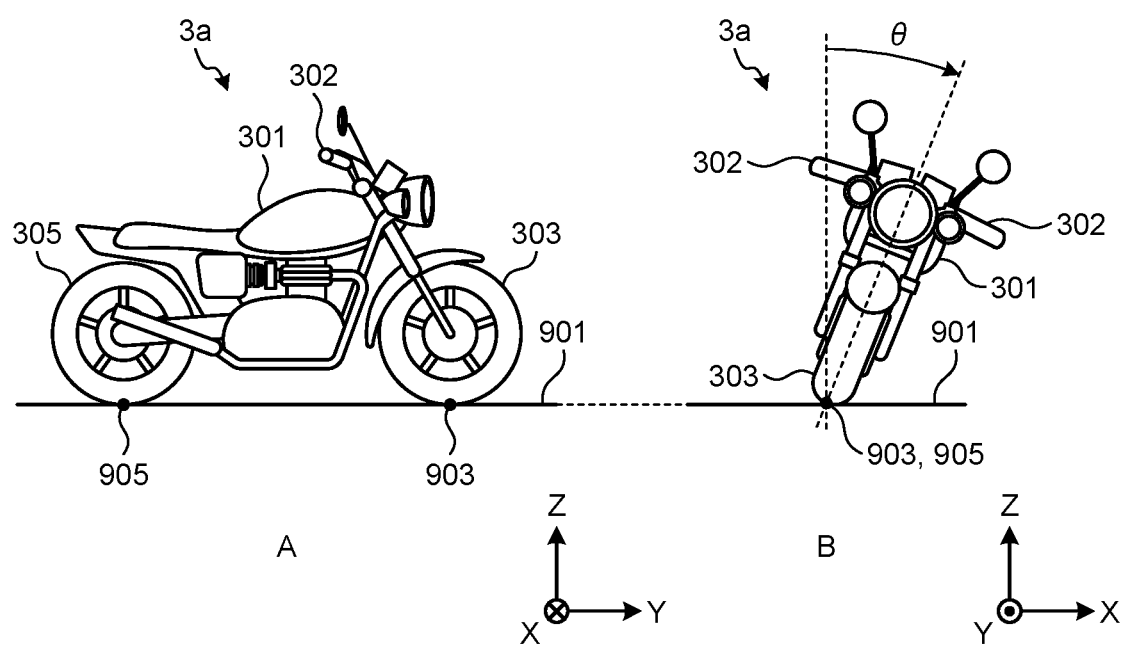
FIG. 2 is a diagram illustrating a lean angle according to the embodiment.

FIG. 1 is a diagram schematically illustrating an example of a driving assistance system 1 according to an embodiment. As illustrated in FIG. 1, the driving assistance system 1 includes a plurality of vehicles 3. FIG. 1 illustrates a first vehicle 3*a* and a second vehicle 3*b* as the plurality of vehicles 3. It is assumed that the second vehicle 3*b* is the vehicle 3 different from the first vehicle 3*a*. FIG. 2 is a diagram illustrating a lean angle θ according to the embodiment. FIG. 2 illustrates the first vehicle 3*a*.

As illustrated in FIGS. 1 and 2, each of the plurality of vehicles 3 includes a vehicle body and at least one wheel disposed in a predetermined direction. The vehicle body of the vehicle 3 is supported by wheels. The vehicle 3 includes a driving machine (not illustrated), and is movable by driving at least one wheel (driving wheel) of the wheels of the vehicle 3 by power of the driving machine. As the driving machine, any driving machine such as an engine using gasoline, hydrogen, or the like as a fuel, a motor using electric power from a battery, or a combination of the engine and the motor can be applied. The vehicle 3 can move forwards or rearwards by switching a gear (not illustrated) or the like. The vehicle 3 can also turn right or left by steering.

The first vehicle 3*a* is an example of the vehicle 3 on which at least a wireless communication device 10*a* is mounted. The wireless communication device 10*a* is a device capable of transmitting a wireless signal WS including at least the position, the speed, and the lean angle θ of the first vehicle 3*a*. The wireless signal WS may include a vehicle type of the first vehicle 3*a*. The vehicle type is information indicating the type of the vehicle 3. As an example, the vehicle type of the first vehicle 3*a* is information indicating a two-wheeled vehicle.

The first vehicle 3*a* is the vehicle 3 traveling on a curved road CR mainly by inclining a vehicle body 301 with the traveling direction as a rotation axis, that is, by banking the vehicle body 301. Of course, when the first vehicle 3a travels on the curved road CR, the vehicle body 301 is banked, and the steering angle of a wheel (for example, front wheel 303) can be changed by steering handlebars 302. In the present embodiment, as illustrated in FIGS. 1 and 2, a description will be given as to a case where the first vehicle 3a is a two-wheeled vehicle including the vehicle body 301, and the front wheel 303 and a rear wheel 305 that support the vehicle body 301, but the present disclosure is not limited to the case. The first vehicle 3a may be any vehicle 3 that travels on the curved road CR mainly by banking the vehicle body, and may be, for example, any vehicle 3 other than a two-wheeled vehicle such as a unicycle or a tricycle (trike).

The second vehicle 3b is the vehicle 3 on which at least a driving assistance device 10b is mounted, and the driving assistance device 10b is a device capable of receiving the wireless signal WS transmitted from the wireless communication device 10a.

The second vehicle 3b is the vehicle 3 traveling on the curved road CR without banking its vehicle body, that is, by changing the steering angle of the wheels by steering the steering wheel. In the present embodiment, as shown in FIG. 1, a case where the second vehicle 3b is a four-wheeled vehicle is described as an example, but the present disclosure is not limited thereto. Similarly to the first vehicle 3a, the second vehicle 3b may be the vehicle 3 traveling on the curved road CR by banking the vehicle body.

Here, although FIG. 1 illustrates the driving assistance system 1 including the two vehicles 3, the present disclosure is not limited thereto. In the driving assistance system 1, at least one of the first vehicle 3a and the second vehicle 3b may be two or more vehicles.

Further, the first vehicle 3a may be mounted with the driving assistance device 10b in addition to the wireless communication device 10a. In this case, the driving assistance device 10b of the first vehicle 3a can be set to perform reception processing (refer to FIG. 6 or 8) related to the wireless signal WS from another first vehicle 3a on which the wireless communication device 10a is mounted.

The second vehicle 3b may be mounted with the wireless communication device 10a in addition to the driving assistance device 10b. In this case, the wireless communication device 10a of the second vehicle 3b can be set to perform transmission processing (refer to FIG. 5) related to the wireless signal WS. Here, the wireless communication device 10a of the second vehicle 3b can transmit the wireless signal WS not including the lean angle θ in the transmission processing. When the second vehicle 3b is the vehicle 3 traveling on the curved road CR by banking the vehicle body, the wireless communication device 10a of the second vehicle 3b can transmit the wireless signal WS including the lean angle θ in the transmission processing.

In the present embodiment, a direction in which the vehicle 3 moves forwards is referred to as a traveling direction for simplicity of description. For example, in the state in which the first vehicle 3a is traveling straight, that is, when the vehicle body 301 is in an upright state, or when the second vehicle 3b is traveling straight, the traveling direction is a direction in the forward-and-rearward direction (Y-axis direction in FIG. 2) of the vehicle body. For example, when the vehicle body of the vehicle 3 is in the upright state (state in A of FIG. 2), the forward-and-rearward direction of the vehicle body is assumed to be a direction horizontal to a road surface 901. The left-and-right direction of the vehicle body is assumed to be a direction orthogonal to the forward-and-rearward direction of the vehicle body (X-axis direction in FIG. 2). For example, when the vehicle body of the vehicle 3 is in the upright state, the left-and-right direction of the vehicle body is assumed to be a direction orthogonal to the forward-and-rearward direction of the vehicle body and horizontal to the road surface 901. The upward-and-downward direction of the vehicle body is assumed to be a direction (Z-axis direction in FIG. 2) orthogonal to the forward-and-rearward direction and the left-and-right direction of the vehicle body. For example, when the vehicle body of the vehicle 3 is in the upright state, the upward-and-downward direction the vehicle body is assumed to be a direction perpendicular to the road surface 901.

Here, the rotation angle of the vehicle body 301 with the traveling direction (Y-axis direction in FIG. 2) of the first vehicle 3a as the rotation axis is defined as the lean angle θ. In the present embodiment, the lean angle θ is an angle formed by a direction perpendicular to the road surface 901 and the upward-and-downward direction of the vehicle body 301, as illustrated in B of FIG. 2. For example, it is assumed that the lean angle θ is 0° when the vehicle body 301 of the first vehicle 3a is in the upright state. In addition, it is assumed that the lean angle θ is positive when the vehicle body 301 is inclined clockwise as viewed from the front (Y+ side in FIG. 2) in the traveling direction of the vehicle body 301 of the first vehicle 3a. That is, in the present embodiment, when the first vehicle 3a travels on the curved road CR that turns to the left, that is, when the vehicle body 301 is banked to the left in the traveling direction, the lean angle θ is assumed to be positive. Similarly, it is assumed that the lean angle θ is negative when the vehicle body 301 is inclined counterclockwise as viewed from the front in the traveling direction of the vehicle body 301 of the first vehicle 3a. That is, in the present embodiment, when the first vehicle 3a travels on the curved road CR that turns to the right, that is, when the vehicle body 301 is banked to the right in the traveling direction, the lean angle θ is assumed to be negative.

It is noted that the lean angle θ may be defined by another angle such as an angle formed by a direction perpendicular to the road surface 901 (Z-axis direction in FIG. 2) and the left-and-right direction of the vehicle body 301 (X-axis direction in the state of A of FIG. 2). Further, the state of the vehicle body 301 in which the lean angle θ is set to 0° may be another state in which the vehicle body 301 of the first vehicle 3a is in the upright state. The positive and negative directions of the lean angle θ can also be freely and selectively set. Additionally, FIG. 2 illustrates a case where the rotation center of the lean angle θ is located on a straight line passing through a ground contact surface 903 of the front wheel 303 and a ground contact surface 905 of the rear wheel 305, that is, a case where the rotation axis of the vehicle body 301 is on the road surface 901, but the present disclosure is not limited thereto. The rotation center defining the lean angle θ may be set at any position in the upward-and-downward direction of the vehicle body 301.

Figure 3:
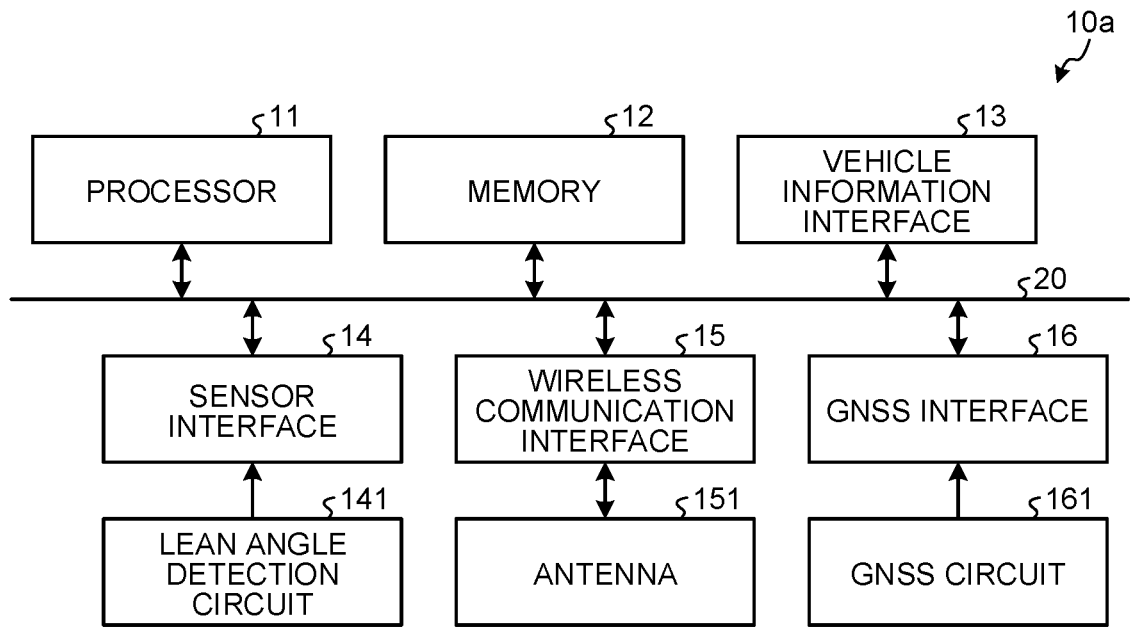
FIG. 3 is a block diagram illustrating an example of a hardware configuration of a wireless communication device according to the embodiment.

FIG. 3 is a block diagram illustrating an example of a hardware configuration of the wireless communication device 10a according to the embodiment. The wireless communication device 10a is an information processing device set to be mounted on the first vehicle 3a, and is, for example, an electronic control unit (ECU) provided inside the first vehicle 3a. Alternatively, the wireless communication device 10a may be an external device installed near handlebars or a meter panel of the vehicle 3. It is noted that the wireless communication device 10a may be configured to be integrated with a car navigation device or the like.

The wireless communication device 10a has a hardware configuration using a normal computer. As an example, as illustrated in FIG. 3, the wireless communication device 10a includes a processor 11, a memory 12, a vehicle information interface 13, a sensor interface 14, a lean angle detection circuit 141, a wireless communication interface 15, an antenna 151, a global navigation satellite system (GNSS) interface 16, and a GNSS circuit 161. The processor 11, the memory 12, the vehicle information interface 13, the sensor interface 14, the wireless communication interface 15, and the GNSS interface 16 are communicably connected to each other by a bus 20.

Figure 4:
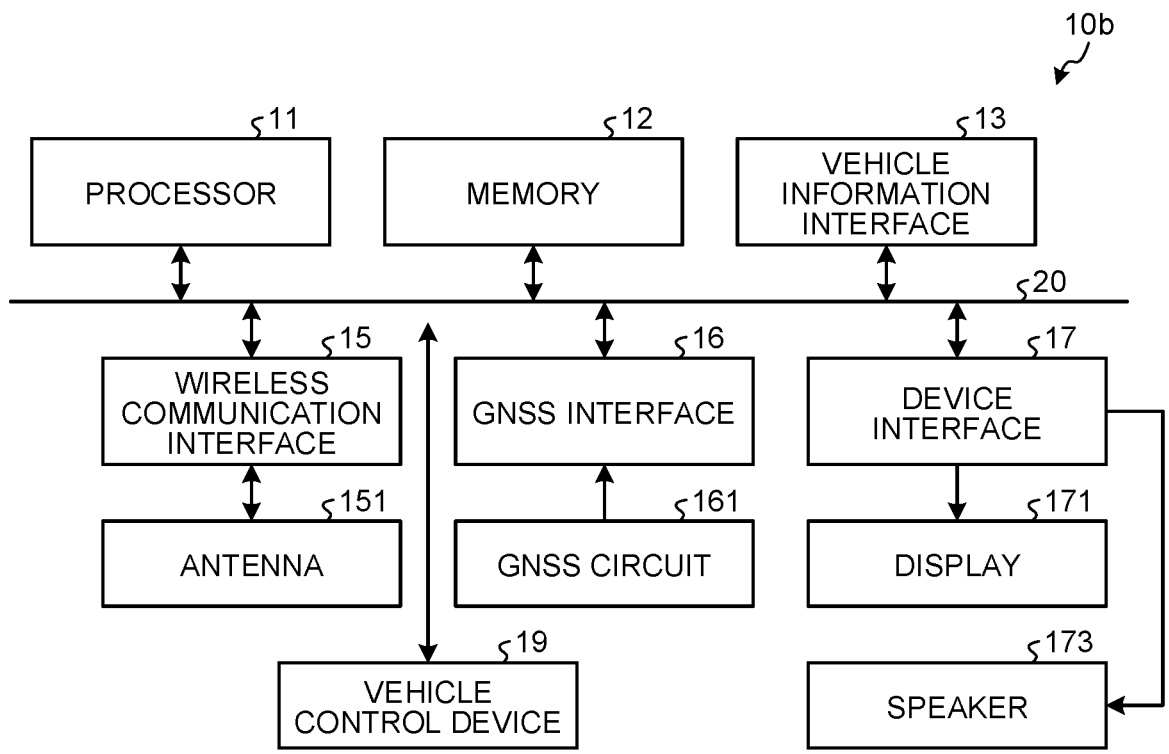
FIG. 4 is a block diagram illustrating an example of a hardware configuration of a driving assistance device according to the embodiment.

FIG. 4 is a block diagram illustrating an example of a hardware configuration of the driving assistance device 10b according to the embodiment. The driving assistance device 10b is an information processing device set to be mounted on the second vehicle 3b, and is, for example, an electronic control unit (ECU) or an on board unit (OBU) provided inside the second vehicle 3b. Alternatively, the driving assistance device 10b may be an external device installed near a dashboard of the vehicle 3. Further, the driving assistance device 10b may be configured to be integrated with a car navigation device or the like.

The driving assistance device 10b has a hardware configuration using a normal computer. As an example, as illustrated in FIG. 4, the driving assistance device 10b includes a processor 11, a memory 12, a vehicle information interface 13, a wireless communication interface 15, an antenna 151, a GNSS interface 16, a GNSS circuit 161, a device interface 17, a display 171, a speaker 173, and a vehicle control device 19. The processor 11, the memory 12, the vehicle information interface 13, the wireless communication interface 15, the GNSS interface 16, and the device interface 17 are communicably connected to each other by a bus 20.

Hereinafter, when either the wireless communication device 10a or the driving assistance device 10b is not specified, the term "device 10" will be used simply. In addition, the respective components of the wireless communication device 10a and the driving assistance device 10b may be distinguished by adding a and b to the end of the reference numerals.

The processor 11 is an arithmetic device configured to control the entire device 10. As the processor 11, various processors such as a central processing unit (CPU) and an application specific integrated circuit (ASIC) can be used as appropriate. The processor 11 may be configured by a plurality of processors configured to implement at least one of respective pieces of processing described later. Here, a processor 11b of the driving assistance device 10b is an example of a control circuit.

As an example, the processor 11b of the driving assistance device 10b is configured to determine the possibility of collision between the first vehicle 3a and the second vehicle 3b based on at least the position, the speed, and the lean angle θ of the first vehicle 3a and the position and the speed of the second vehicle 3b. The processor 11b is configured to cause a notification device to be described later to output a predetermined notification to a driver of the second vehicle 3b when the possibility of collision therebetween is equal to or greater than a certain level.

As an example, the processor 11b is configured to determine whether the first vehicle 3a is a two-wheeled vehicle traveling on the curved road based on the lean angle θ of the first vehicle 3a. As an example, the processor 11b is configured to determine whether the curved road CR on which the two-wheeled vehicle (first vehicle 3a) is traveling is in front of the own vehicle based on the position information of the first vehicle 3a included in the wireless signal WS and the position information of the own vehicle (second vehicle 3b). Furthermore, the processor 11b is also configured to determine whether the first vehicle 3a is approaching the second vehicle 3b from the front based on at least the position and the speed of the first vehicle 3a.

As an example, when it is determined that the first vehicle 3a is the two-wheeled vehicle traveling on the curved road CR ahead, the processor 11b is configured to notify the driver of the second vehicle 3b of first notification information indicating that the curved road CR is present ahead of the second vehicle 3b by a notification device to be described later. Here, a case where the first vehicle 3a is determined to be a two-wheeled vehicle traveling on the curved road CR present ahead of the second vehicle 3b is an example of a case where the possibility of collision between the first vehicle 3a and the second vehicle 3b is equal to or greater than a certain level.

As an example, when it is determined that the first vehicle 3a is the two-wheeled vehicle traveling on the curved road CR and the first vehicle 3a is approaching the second vehicle 3b from the front, the processor 11b is configured to notify the driver of the second vehicle 3b of second notification information indicating that the two-wheeled vehicle is approaching on the curved road CR by a notification device to be described later. Here, a case where it is determined that the first vehicle 3a is a two-wheeled vehicle traveling on the curved road CR and the first vehicle 3a is approaching the second vehicle 3b from the front is an example of a case where the possibility of collision between the first vehicle 3a and the second vehicle 3b is equal to or greater than a certain level.

As an example, the processor 11b is configured to determine whether the first vehicle 3a is a two-wheeled vehicle traveling on the curved road CR based on the time series of the lean angle θ of the first vehicle 3a. Specifically, the processor 11b is configured to determine that the first vehicle 3a is a two-wheeled vehicle traveling on the curved road CR when the lean angle θ of the first vehicle 3a is continuously equal to or greater than a predetermined first threshold value for a time equal to or longer than a predetermined first time.

As an example, each of the first threshold value and the first time is determined depending on the speed of the first vehicle 3a. At least one of the first threshold value and the first time may be a fixed value independent of the speed of the first vehicle 3a.

The memory 12 is implemented by, for example, a storage medium such as a random access memory (RAM), a read only memory (ROM), a flash memory, or a hard disk drive (HDD). The memory 12 stores, for example, various programs executed by the device 10 and various parameters such as a threshold value to be used when the programs are executed. In addition, the memory 12 may store the vehicle type of the vehicle 3 on which each of the wireless communication device 10a and the driving assistance device 10b is mounted.

As an example, the CPU as the processor 11 implements each processing to be described later by executing the program stored in the ROM of the memory 12.

It is noted that each program executed by the device 10 may be configured to be provided by being recorded in a computer-readable recording medium such as a CD-ROM, a flexible disk (FD), a CD-R, or a digital versatile disk (DVD) as a file in an installable format or an executable format. Furthermore, each program executed by the device 10 may be configured to be stored on a computer connected to a network such as the Internet and to be provided by being downloaded via the network. In addition, each program executed by the device 10 may be configured to be provided or distributed via a network such as the Internet.

The vehicle information interface 13 is set to connect to, for example, a controller area network (CAN). For example, the vehicle information interface 13 acquires information on the state of the vehicle 3 from another ECU or various sensors of the vehicle 3 via the CAN. The information on the state of the vehicle 3 is, for example, the speed, the steering angle, the acceleration, or the like of the vehicle 3. It is noted that the vehicle information interface 13 may acquire the vehicle type of the vehicle 3 from another ECU via, for example, the CAN.

Here, a vehicle information interface 13a of the first vehicle 3a is an example of an input circuit (first input circuit). Further, a vehicle information interface 13b of the second vehicle 3b is an example of an input circuit (second input circuit). The vehicle information interface 13 acquires the speed of the vehicle 3 based on, for example, vehicle speed information flowing in the CAN. The vehicle information interface 13 acquires a vehicle speed pulse from a vehicle speed sensor (not illustrated) attached to the axle via, for example, the CAN and acquires the speed of the vehicle 3 based on the vehicle speed pulse. Here, the vehicle speed sensor attached to the axle is an example of a speed detection circuit capable of detecting the speed of the vehicle 3.

The sensor interface 14 of the first vehicle 3a is set to connect to the lean angle detection circuit 141. The sensor interface 14 is an interface for acquiring information on the lean angle from the lean angle detection circuit 141. The information on the lean angle is information indicating the rotation angle of the vehicle body 301 with the traveling direction of the first vehicle 3a as the rotation axis. The lean angle detection circuit 141 is configured to be able to detect the lean angle θ of the vehicle body 301 with the traveling direction of the first vehicle 3a as the rotation axis. The lean angle detection circuit 141 is, for example, a six-axis acceleration sensor. The six-axis acceleration sensor detects acceleration and angular velocity applied to the first vehicle 3a in each of the forward-and-rearward direction, the left-and-right direction, and the upward-and-downward direction of the vehicle body 301 of the first vehicle 3a. Here, the sensor interface 14 is an example of an input circuit (first input circuit) of the first vehicle 3a.

It is noted that the wireless communication device 10a can also be applied to the vehicle 3 on which the lean angle detection circuit 141 is separately mounted. The vehicle 3 may be either the first vehicle 3a or the second vehicle 3b. In this case, the wireless communication device 10a may not include the lean angle detection circuit 141. That is, the lean angle detection circuit 141 may be provided outside the wireless communication device 10a. Furthermore, the vehicle information interface 13 may acquire a detection result by the lean angle detection circuit 141 via, for example, the CAN. In this case, the wireless communication device 10a may not include the sensor interface 14 set to connect to the lean angle detection circuit 141.

The wireless communication interface 15 is set to connect to the antenna 151. The wireless communication interface 15 is an interface for transmitting and receiving the wireless signal WS between the vehicle 3 and the other vehicle 3 or a roadside device via the antenna 151. Transmission and reception of the information are performed by, for example, Vehicle-to-cellular-Network (V2X).

It is noted that a communication method is, for example, a method conforming to the IEEE Wi-Fi (registered trademark) protocol or the like, but is not limited thereto. Further, the information transmitted and received by the wireless communication interface 15 may be information designating a specific vehicle 3 as a destination, or may be information broadcast from an unspecified vehicle 3, that is, the vehicle 3 or a roadside device to the surroundings. In the present embodiment, the information transmitted from the vehicle 3 or the roadside device by V2X communication is referred to as the wireless signal WS.

In the present embodiment, the wireless communication interface 15 can receive the wireless signal WS related to the other vehicle 3 broadcast from the other vehicle by V2X communication. In addition, the wireless communication interface 15 can broadcast (transmit) the wireless signal WS related to the vehicle 3 to the surroundings. The wireless signal WS may be transmitted and received between the plurality of vehicles 3 via the roadside device.

In the present embodiment, a wireless communication interface 15a of the first vehicle 3a is configured to be able to transmit the wireless signal WS including at least the position, the speed, and the lean angle θ of the first vehicle 3a. The wireless communication interface 15a is configured to repeatedly transmit the wireless signal WS at predetermined time intervals. An antenna 151a of the first vehicle 3a is configured to output at least the wireless signal WS as a radio wave. Here, the wireless communication interface 15a of the first vehicle 3a is an example of an output circuit (first output circuit) of the first vehicle 3a. Additionally, the wireless signal WS output from the wireless communication interface 15a via the antenna 151a is an example of the first wireless signal.

In the present embodiment, an antenna 151b of the second vehicle 3b is configured to be able to receive at least the wireless signal WS as a radio wave. In addition, a wireless communication interface 15b of the second vehicle 3b is configured to be able to receive the wireless signal WS including at least the position, the speed, and the lean angle θ of the first vehicle 3a transmitted from the wireless communication device 10a. In other words, the wireless communication interface 15b is set to receive at least the wireless signal WS including the position, the speed, and the lean angle θ of the first vehicle 3a. Here, the wireless communication interface 15b of the second vehicle 3b is an example of an input circuit (second input circuit) of the second vehicle 3b.

Furthermore, when the wireless communication device 10a is mounted on the second vehicle 3b, the wireless communication interface 15b is configured to be able to transmit the wireless signal WS including at least the position and the speed of the second vehicle 3b. The wireless signal WS may include the vehicle type of the second vehicle 3b. When the wireless communication device 10a is mounted on the second vehicle 3b traveling on the curved road CR by banking the vehicle body, the wireless communication interface 15b is configured to be able to transmit the wireless signal WS further including the lean angle θ. Additionally, the antenna 151b of the second vehicle 3b can be configured to output at least the wireless signal WS as a radio wave. In this case, the wireless communication interface 15b is an example of an output circuit (second output circuit) of the second vehicle 3b. In addition, the wireless signal WS output from the wireless communication interface 15b via the antenna 151b is an example of a second wireless signal.

It is noted that the wireless communication interface 15b of the second vehicle 3b is configured to be able to receive the wireless signal WS including at least the position and the speed of the second vehicle 3b transmitted from the other second vehicle 3b. The wireless signal WS may include the vehicle type of the other second vehicle 3b.

The GNSS interface 16 is set to connect to the GNSS circuit 161. The GNSS interface 16 is an interface for acquiring position information of the vehicle 3 from the GNSS circuit 161. The GNSS circuit 161 is, for example, a global positioning system (GPS) module, and acquires position information based on a GPS signal received from a GPS satellite. In the present embodiment, GNSS coordinates are described as the position information of the vehicle 3, but the position of the vehicle 3 may be specified by another method. For example, the position of the vehicle 3 may be defined by position coordinates of a reference point and a distance that the vehicle 3 has moved from the reference point. The moving distance of the vehicle 3 from the reference point can be calculated based on, for example, the speed and the acceleration of the vehicle 3.

Here, a GNSS interface 16a of the first vehicle 3a is an example of an input circuit (first input circuit). A GNSS interface 16b of the second vehicle 3b is an example of an input circuit (second input circuit). The GNSS interface 16 acquires the position of the vehicle 3 based on, for example, the position information of the vehicle 3 from the GNSS circuit 161. In this case, the GNSS circuit 161 is an example of a position detection circuit capable of detecting the position of the vehicle 3. In addition, the GNSS interface 16 acquires the speed of the vehicle 3 based on, for example, the time series of the position information of the vehicle 3 from the GNSS circuit 161. In this case, the GNSS circuit 161 is an example of a speed detection circuit capable of detecting the speed of the vehicle 3.

It is noted that each of the wireless communication device 10a and the driving assistance device 10b can also be applied to the vehicle 3 on which the GNSS circuit 161 is separately mounted. The vehicle 3 may be either the first vehicle 3a or the second vehicle 3b. In this case, each of the wireless communication device 10a and the driving assistance device 10b may not include the GNSS circuit 161. That is, the GNSS circuit 161 may be provided outside the wireless communication device 10a or the driving assistance device 10b. In addition, the vehicle information interface 13 may acquire the position information of the vehicle 3 from the GNSS circuit 161 via, for example, the CAN. In this case, each of the wireless communication device 10a and the driving assistance device 10b may not have the GNSS interface 16 set to connect to the GNSS circuit 161.

The device interface 17 of the second vehicle 3b is set to output a warning. Specifically, the device interface 17 of the second vehicle 3b is set to connect to at least one of the display 171 and the speaker 173. In other words, the driving assistance device 10b may not include either the display 171 or the speaker 173. Hereinafter, the display 171 and the speaker 173 will be collectively referred to as a notification device. The device interface 17 is an interface for outputting a predetermined notification to the driver of the vehicle 3 by the notification device. Here, the predetermined notification is, for example, a warning as described later.

The notification device of the second vehicle 3b is provided, for example, around the driver's seat of the vehicle body. It is noted that the notification device is only required to be able to output a predetermined notification so as to be recognizable by the driver of the vehicle 3, and may be provided in another portion around the driver's seat, such as a rear seat.

For example, the display 171 is configured to be able to output an image. The display 171 can output a predetermined notification as an image. The display 171 is provided on the second vehicle 3b so that the driver of the second vehicle 3b can visually recognize an output image. The display 171 is a display device such as a liquid crystal display or an organic electro-luminescence (EL) display. The display 171 may be a display of a car navigation device mounted on the vehicle 3. Furthermore, the display 171 may be configured as a head mounted display (HMD) mounted on the head of the driver. Furthermore, the display 171 may be a projection type display device. It is noted that the display 171 may be configured as a touch panel display on which a driver or a passenger can perform a touch operation. Here, the display 171 is an example of an image output circuit.

For example, the speaker 173 is configured to be able to output a sound. The speaker 173 can output a predetermined notification as a sound. The speaker 173 is provided in the second vehicle 3b so that the driver of the vehicle 3 can listen to the output sound. In the present embodiment, the sound is not limited to language and includes a notification sound or a warning sound. Here, the speaker 173 is an example of a sound emission circuit.

The vehicle control device 19 of the second vehicle 3b can control at least one of acceleration/deceleration, braking, and steering of the second vehicle 3b. For example, the vehicle control device 19 moves the second vehicle 3b by automatic driving control. In addition, the present embodiment includes not only normal automatic driving control for controlling the behavior of the second vehicle 3b when the second vehicle 3b travels on the road, but also parking assistance for assisting parking of the vehicle 3 at the target position.

It is noted that the first vehicle 3a is mounted with a vehicle control device 19a (not illustrated). In addition, FIG. 4 illustrates a case where the vehicle control device 19 is included in the driving assistance device 10b, but the present disclosure is not limited thereto. The vehicle control device 19 may be provided as an individual device outside the driving assistance device 10b.

Next, a description will be given as to a flow of driving assistance processing executed by the driving assistance system 1 configured as described above. The driving assistance processing executed by the driving assistance system 1 includes driving assistance processing on the transmission side executed by the wireless communication device 10a and driving assistance processing on the reception side executed by the driving assistance device 10b.

Figure 5:
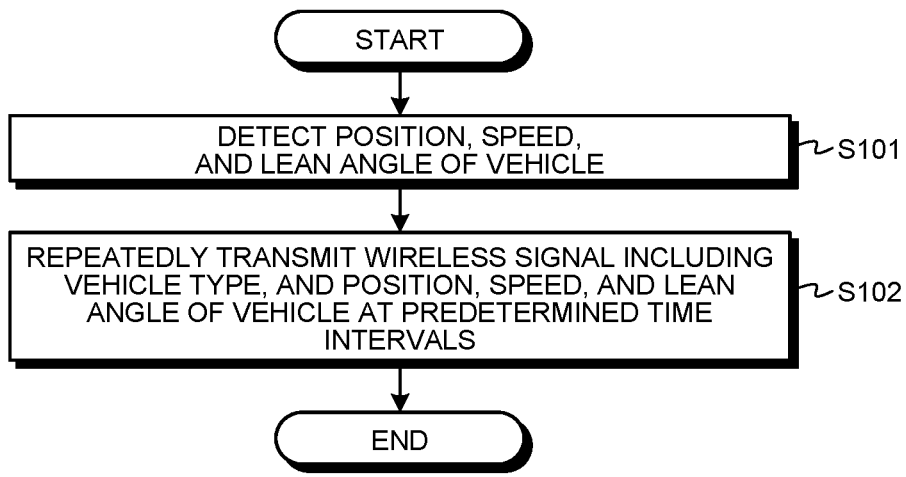
FIG. 5 is a flowchart illustrating an example of a flow of driving assistance processing on the transmission side executed by the wireless communication device according to the embodiment.

FIG. 5 is a flowchart illustrating an example of a flow of the driving assistance processing on the transmission side executed by the wireless communication device 10a according to the embodiment.

First, the wireless communication device 10a detects the position, the speed, and the lean angle θ of the first vehicle 3a (S101). As an example, the GNSS interface 16a of the wireless communication device 10a detects the position of the vehicle 3 based on the position information of the vehicle 3 from the GNSS circuit 161. In addition, the GNSS interface 16a detects the speed of the vehicle 3 based on the time series of the position information. In addition, the sensor interface 14 of the wireless communication device 10a detects the lean angle θ of the vehicle 3 based on the rotation angle of the vehicle body 301 with the traveling direction from the lean angle detection circuit 141 as the rotation axis.

Then, the wireless communication device 10a repeatedly transmits the wireless signal WS including the vehicle type, the position, the speed, and the lean angle θ of the first vehicle 3a at predetermined time intervals (S102). As an example, the wireless communication interface 15a of the wireless communication device 10a transmits the wireless signal WS including the vehicle type, the position, the speed, and the lean angle θ of the first vehicle 3a as a radio wave by the antenna 151a.

It is noted that the wireless communication device 10a may repeatedly transmit the wireless signal WS at predetermined time intervals by repeating the processing of S101 and S102 at predetermined time intervals. Alternatively, the wireless communication device 10a may transmit the wireless signal WS a plurality of times at predetermined time intervals every time the vehicle type, the position, the speed, and the lean angle θ of the first vehicle 3a are detected once.

Figure 6:
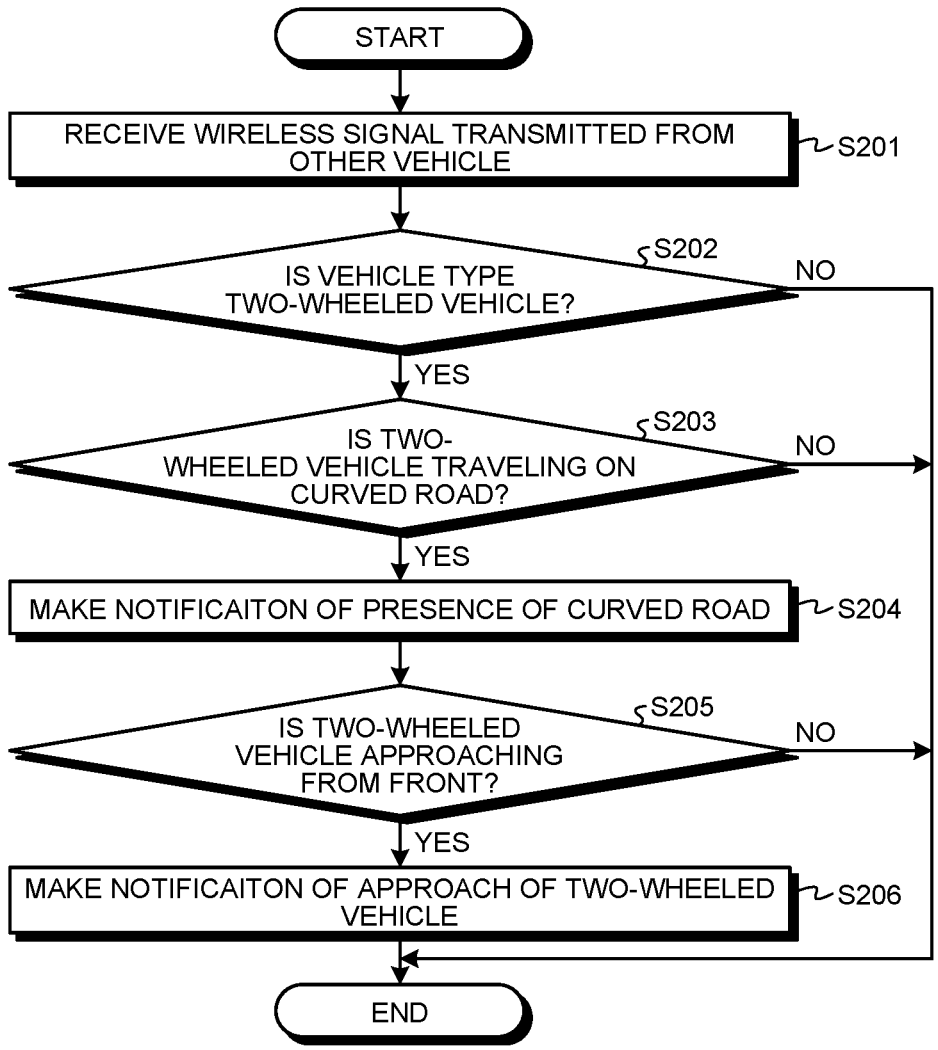
FIG. 6 is a flowchart illustrating an example of a flow of driving assistance processing on the reception side executed by the driving assistance device according to the embodiment.
Figure 7:
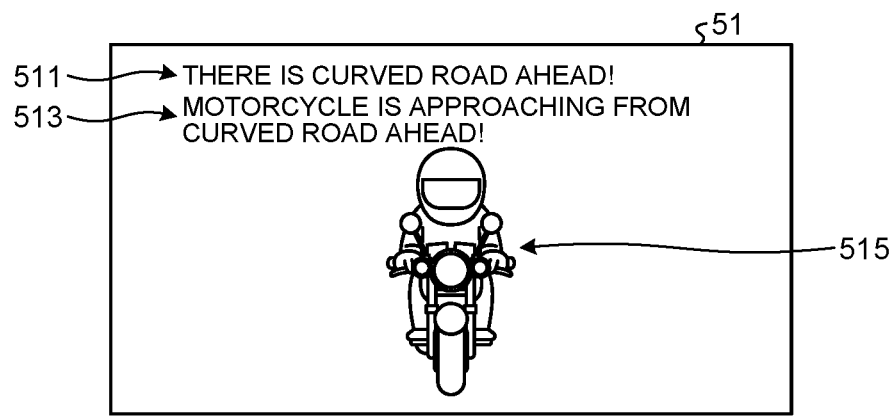
FIG. 7 is a diagram schematically illustrating an example of a notification screen displayed on a display in the driving assistance processing on the reception side in FIG. 6.

FIG. 6 is a flowchart illustrating an example of a flow of the driving assistance processing on the reception side executed by the driving assistance device 10b according to the embodiment. FIG. 7 is a diagram schematically illustrating an example of a notification screen 51 displayed on the display 171 in the driving assistance processing on the reception side in FIG. 6. Here, a case where the first vehicle 3a is a two-wheeled vehicle will be described as an example.

First, the driving assistance device 10b receives the wireless signal WS transmitted from the other vehicle 3 (S201). As an example, the wireless communication interface 15b of the driving assistance device 10b receives the wireless signal WS transmitted as a radio wave from the other vehicle 3 by the antenna 151b.

Then, the processor 11b of the driving assistance device 10b determines whether the vehicle type included in the received wireless signal WS is a two-wheeled vehicle (S202). In other words, the processor 11b determines whether the wireless signal WS from the two-wheeled vehicle (first vehicle 3a) is received. When the vehicle type included in the received wireless signal WS is not a two-wheeled vehicle (S202: No), the flow of FIG. 6 ends.

On the other hand, when the vehicle type included in the received wireless signal WS is the two-wheeled vehicle (S202: Yes), the processor 11b of the driving assistance device 10b determines whether the two-wheeled vehicle is traveling on the curved road CR ahead based on information indicating the lean angle θ and the position of the two-wheeled vehicle included in the wireless signal WS and position information of the own vehicle (S203). When it is not determined that the two-wheeled vehicle is traveling on the curved road CR ahead (S203: No), the flow of FIG. 6 ends.

On the other hand, when it is determined that the two-wheeled vehicle is traveling on the curved road CR ahead (S203: Yes), the device interface 17 of the driving assistance device 10b notifies the driver of first notification information 511 (warning) that makes notification of the presence of the curved road ahead by a notification device (S204).

For example, as illustrated in FIG. 7, when it is determined that the two-wheeled vehicle is traveling on the curved road CR, the device interface 17 of the driving assistance device 10b notifies the driver of the first notification information 511 indicating that "there is a curve ahead!" by causing the display 171 to display the notification screen 51 including the first notification information 511. It is noted that the notification screen 51 displayed in this step does not include second notification information 513 and an icon 515 to be described later.

For example, when it is determined that the two-wheeled vehicle is traveling on the curved road CR, the device interface 17 of the driving assistance device 10b notifies the driver of a sound indicating the first notification information 511 indicating that "there is a curve ahead!" by causing the speaker 173 to output the sound.

Then, the processor 11b of the driving assistance device 10b determines whether the two-wheeled vehicle is approaching the own vehicle from the front based on at least the position and the speed of the two-wheeled vehicle included in the wireless signal WS (S205). When it is not determined that the two-wheeled vehicle is approaching the own vehicle from the front (S205: No), the flow of FIG. 6 ends.

On the other hand, when it is determined that the two-wheeled vehicle is approaching the own vehicle from the front (S205: Yes), the device interface 17 of the driving assistance device 10b notifies the driver of the second notification information 513 (warning) that notifies the approach of the two-wheeled vehicle by the notification device (S206).

For example, as illustrated in FIG. 7, when it is determined that the two-wheeled vehicle traveling on the curved road CR approaches the own vehicle from the front, the device interface 17 of the driving assistance device 10b notifies the driver of the second notification information 513 indicating that "a motorcycle is approaching from a curved road ahead!" by causing the display 171 to display the notification screen 51 including the second notification information 513. Additionally, as illustrated in FIG. 7, the notification screen 51 may include the icon 515 indicating the presence of the motorcycle. It is noted that the notification screen 51 displayed in this step may or may not include the first notification information 511 described above.

For example, when it is determined that the two-wheeled vehicle traveling on the curved road CR is approaching the own vehicle from the front, the device interface 17 of the driving assistance device 10b notifies the driver of a sound indicating the second notification information 513 indicating that "a motorcycle is approaching from a curved road ahead!" by causing the speaker 173 to output the sound. It is noted that the device interface 17 may output the first notification information 511 described above by sound together with the second notification information 513.

It is noted that the output of each piece of notification information may be implemented by at least one of the display 171 and the speaker 173. For example, even when the device interface 17 of the second vehicle 3b is set to connect to both the display 171 and the speaker 173, each piece of the notification information may be output by either the display 171 or the speaker 173. Furthermore, for example, a notification device for output may be appropriately selected depending on the notification information such as outputting the first notification information 511 by an image and outputting the second notification information 513 by an image and sound.

As described above, in the driving assistance system 1 according to the present embodiment, the wireless communication device 10a is configured to detect the lean angle θ of the first vehicle 3a, that is, the inclination angle of the vehicle body 301, and to transmit the detected lean angle θ by wireless communication such as V2X.

As an example, the wireless communication device 10a is set to be mounted on the first vehicle 3a including at least one wheel. As an example, the wireless communication device 10a includes the sensor interface 14 (first input circuit) set to connect to the lean angle detection circuit 141. As an example, the wireless communication device 10a includes the wireless communication interface 15a (first output circuit) configured to repeatedly transmit the wireless signal WS including at least the position, the speed, and the lean angle θ of the first vehicle 3a at predetermined time intervals.

According to this configuration, the driving assistance device 10b of the second vehicle 3b can determine the possibility of collision between the own vehicle (second vehicle 3b) and the oncoming vehicle (first vehicle 3a) based on the wireless signal WS including the lean angle θ from the first vehicle 3a. For example, the driving assistance device 10b can determine whether the first vehicle 3a is traveling on the curved road based on the lean angle θ.

For example, a two-wheeled vehicle traveling on the curved road has a risk that it may run off into an opposite lane or fall over. That is, on the curved road, there is a problem that a collision accident between the own vehicle and the oncoming vehicle is likely to occur, such as a case where the oncoming vehicle such as the two-wheeled vehicle runs off into the traveling lane of the own vehicle. For this reason, from the viewpoint of suppressing the collision accident with the two-wheeled vehicle traveling on the curved road, there is a demand for a technique of notifying the driver of the own vehicle of the curved road and the presence of the two-wheeled vehicle traveling on the curved road.

Under such circumstances, the wireless communication device 10a according to the present embodiment can notify the driver of the second vehicle 3b who has received the wireless signal WS of the presence of the curved road ahead or the presence of the two-wheeled vehicle traveling on the curved road. Therefore, with the wireless communication device 10a of the present embodiment, the possibility of collision with the oncoming vehicle (first vehicle 3a) can be recognized by the driver of the second vehicle 3b or can be alerted to the driver of the second vehicle 3b, thereby making it possible to suppress the collision accident on the curved road.

As an example, the wireless communication device 10a includes the lean angle detection circuit 141. As an example, the lean angle detection circuit 141 can detect the lean angle θ of the first vehicle 3a with the traveling direction of the first vehicle 3a as the rotation axis. According to this configuration, by setting the wireless communication device 10a to be mounted on the first vehicle 3a, the lean angle θ of the first vehicle 3a can be transmitted to the other vehicle 3 such as the second vehicle 3b by wireless communication such as V2X.

As an example, the wireless communication device 10a includes a GNSS circuit 161a. As an example, the GNSS circuit 161a can detect the position of the first vehicle 3a. As an example, the GNSS interface 16a (first input circuit) is set to connect to the GNSS circuit 161a. According to this configuration, by setting the wireless communication device 10a to be mounted on the first vehicle 3a, the position of the first vehicle 3a can be transmitted to the other vehicle 3 such as the second vehicle 3b by wireless communication such as V2X.

As an example, the wireless communication device 10a includes a GNSS circuit 161a. As an example, the GNSS circuit 161a can detect the speed of the first vehicle 3a. As an example, the GNSS interface 16a (first input circuit) is set to connect to the GNSS circuit 161a. According to this configuration, by setting the wireless communication device 10a to be mounted on the first vehicle 3a, the speed of the first vehicle 3a can be transmitted to the other vehicle 3 such as the second vehicle 3b by wireless communication such as V2X.

As an example, the wireless communication device 10a includes the antenna 151a. As an example, the wireless communication interface 15a (first output circuit) is set to connect to the antenna 151a. As an example, the antenna 151a can output the wireless signal WS as a radio wave. According to this configuration, by setting the wireless communication device 10a to be mounted on the first vehicle 3a, the wireless signal WS including the position, the speed, and the lean angle θ of the first vehicle 3a can be transmitted to the other vehicle 3 such as the second vehicle 3b by wireless communication such as V2X.

In addition, in the driving assistance system 1 according to the present embodiment, the driving assistance device 10b is configured to be able to receive the wireless signal WS transmitted from the wireless communication device 10a. As an example, the driving assistance device 10b is set to be mounted on the second vehicle 3b different from the first vehicle 3a. As an example, the driving assistance device 10b includes at least the wireless communication interface 15b (second input circuit) configured to receive the wireless signal WS including the position, the speed, and the lean angle θ of the first vehicle 3a. As an example, the driving assistance device 10b includes at least the GNSS interface 16b configured to receive the position and the speed of the second vehicle 3b. As an example, the driving assistance device 10b includes the device interface 17 (second output circuit) configured to output a predetermined notification to the driver of the second vehicle 3b when the possibility of collision between the first vehicle 3a and the second vehicle 3b is equal to or greater than a certain level.

According to this configuration, it is possible to notify the driver of the second vehicle 3b of the possibility of collision between the own vehicle (second vehicle 3b) and the oncoming vehicle (first vehicle 3a) based on the wireless signal WS including the lean angle θ from the first vehicle 3a. Accordingly, it is possible to suppress a collision accident on the curved road.

As an example, the driving assistance device 10b includes a GNSS circuit 161b. As an example, the GNSS circuit 161b can detect the position of the second vehicle 3b. As an example, the GNSS interface 16b (second input circuit) is set to connect to the GNSS circuit 161b. According to this configuration, by setting the driving assistance device 10b to be mounted on the second vehicle 3b, it is possible to determine the possibility of collision between the first vehicle 3a and the second vehicle 3b based on at least the wireless signal WS from the wireless communication device 10a and the position of the second vehicle 3b.

As an example, the driving assistance device 10b includes a GNSS circuit 161b. As an example, the GNSS circuit 161b can detect the speed of the second vehicle 3b. As an example, the GNSS interface 16b (second input circuit) is set to connect to the GNSS circuit 161b. According to this configuration, by setting the driving assistance device 10b to be mounted on the second vehicle 3b, it is possible to determine the possibility of collision between the first vehicle 3a and the second vehicle 3b based on at least the wireless signal WS from the wireless communication device 10a and the speed of the second vehicle 3b.

As an example, the driving assistance device 10b includes the antenna 151b. As an example, the wireless communication interface 15b (second input circuit) is set to be connected to the antenna 151b. As an example, the antenna 151b can receive the wireless signal WS as a radio wave. According to this configuration, by setting the driving assistance device 10b to be mounted on the second vehicle 3b, the wireless signal WS including the position, the speed, and the lean angle θ of the first vehicle 3a can be received by the wireless communication such as V2X.

As an example, the device interface 17 (second output circuit) of the driving assistance device 10b is set to connect to the speaker 173 capable of outputting a sound. As an example, the speaker 173 can output a predetermined notification as a sound. According to this configuration, the driver of the second vehicle 3b can be notified of the predetermined notification by sound by setting the driving assistance device 10b to be mounted on the second vehicle 3b.

As an example, the device interface 17 (second output circuit) of the driving assistance device 10b is set to connect to the display 171 capable of outputting an image. As an example, the display 171 can output a predetermined notification as an image. According to this configuration, by setting the driving assistance device 10b to be mounted on the second vehicle 3b, it is possible to notify the driver of the second vehicle 3b of the predetermined notification by an image.

As an example, the device interface 17 (second output circuit) of the driving assistance device 10b outputs a warning as a predetermined notification. According to this configuration, it is possible to warn the driver of the second vehicle 3b about the possibility of collision with the oncoming vehicle (first vehicle 3a).

As an example, the processor 11b of the driving assistance device 10b is configured to determine whether the first vehicle 3a is a two-wheeled vehicle traveling on the curved road based on the lean angle θ of the first vehicle 3a. As an example, when it is determined that the first vehicle 3a is the two-wheeled vehicle traveling on the curved road, the device interface 17 (second output circuit) notifies the driver of the second vehicle 3b of the first notification information 511 indicating that there is a curved road ahead. According to this configuration, the driver of the second vehicle 3b can be alerted to the presence of the curved road ahead.

As an example, the processor 11b of the driving assistance device 10b is configured to determine whether the first vehicle 3a approaches the second vehicle 3b from the front based on at least the position and the speed of the first vehicle 3a. As an example, when it is determined that the first vehicle 3a is a two-wheeled vehicle traveling on the curved road and approaching the second vehicle 3b from the front, the device interface 17 (second output circuit) notifies the driver of the second vehicle 3b of the second notification information 513 indicating that the two-wheeled vehicle is approaching the second vehicle 3b on the curved road. According to this configuration, the driver of the second vehicle 3b can be alerted to the presence of the two-wheeled vehicle approaching the second vehicle 3b from the curved road ahead.

As an example, the processor 11b of the driving assistance device 10b is configured to determine that the first vehicle 3a is the two-wheeled vehicle traveling on the curved road when the lean angle θ of the first vehicle 3a is continuously equal to or greater than the predetermined first threshold value for a time equal to or longer than the predetermined first time. According to this configuration, it is possible to reduce the possibility that the two-wheeled vehicle is determined to be on the curved road when the two-wheeled vehicle swings the vehicle body to the left and right in order to keep balance or when the vehicle body is temporarily tilted due to an obstacle such as a falling object or a road surface condition such as a manhole.

As an example, each of the first threshold value and the first time related to the detection of the curved road is determined depending on the speed of the first vehicle 3a. According to this configuration, for example, when the two-wheeled vehicle has fallen over in a stopped state, it is possible to reduce the possibility that the two-wheeled vehicle is determined to be on the curved road. In addition, even in the curved road having the same curvature, since the lean angle θ required for traveling on the curved road varies depending on the speed of the first vehicle 3a, it is possible to improve the detection accuracy of the curved road.

As an example, the wireless communication interface 15b (second output circuit) of the driving assistance device 10b is set to be connected to the antenna 151b. As an example, the wireless communication interface 15b is set to output the wireless signal WS (second wireless signal) including at least the position and the speed of the second vehicle 3b via the antenna 151b. According to this configuration, by setting the driving assistance device 10b to be mounted on the second vehicle 3b, it is possible to transmit and receive wireless communication such as V2X to and from the other vehicle 3 including the first vehicle 3a.

Second Embodiment

In the present embodiment, a description will be given as to the driving assistance system 1 configured to further determine the possibility of collision between the two-wheeled vehicle (first vehicle 3a) traveling on the curved road ahead and the own vehicle (second vehicle 3b).

As an example, the processor 11b of the driving assistance device 10b according to the present embodiment is configured to predict a predicted traveling trajectory of the first vehicle 3a based on at least the position, the speed, and the lean angle θ of the first vehicle 3a. Further, the processor 11b is configured to further predict a predicted traveling trajectory of the second vehicle 3b based on at least the position and the speed of the second vehicle 3b.

When the second vehicle 3b is the vehicle 3 traveling on the curved road CR by banking the vehicle body of a two-wheeled vehicle or the like, the processor 11b of the driving assistance device 10b may be configured to further predict the predicted traveling trajectory of the second vehicle 3b based on the lean angle θ of the second vehicle 3b.

As an example, the processor 11b of the driving assistance device 10b according to the present embodiment is configured to determine the possibility of collision between the first vehicle 3a and the second vehicle 3b based on the predicted traveling trajectory of the first vehicle 3a. Specifically, the processor 11b is configured to determine that the possibility of collision between the first vehicle 3a and the second vehicle 3b is a certain level or higher when the predicted traveling trajectory of the first vehicle 3a and the predicted traveling trajectory of the second vehicle 3b intersect each other.

It is noted that the processor 11b of the driving assistance device 10b may be configured to determine that the possibility of collision between the first vehicle 3a and the second vehicle 3b is a certain level or higher when the predicted traveling trajectory of the first vehicle 3a and the predicted traveling trajectory of the second vehicle 3b approach each other within a predetermined distance.

As an example, the processor 11b of the driving assistance device 10b according to the present embodiment is configured to notify the driver of the second vehicle 3b of third notification information indicating that there is a risk that the own vehicle (second vehicle 3b) collides with the first vehicle 3a by the notification device when it is determined that the possibility of collision between the first vehicle 3a and the second vehicle 3b is a certain level or higher based on the predicted traveling trajectory of the first vehicle 3a.

Figure 8:
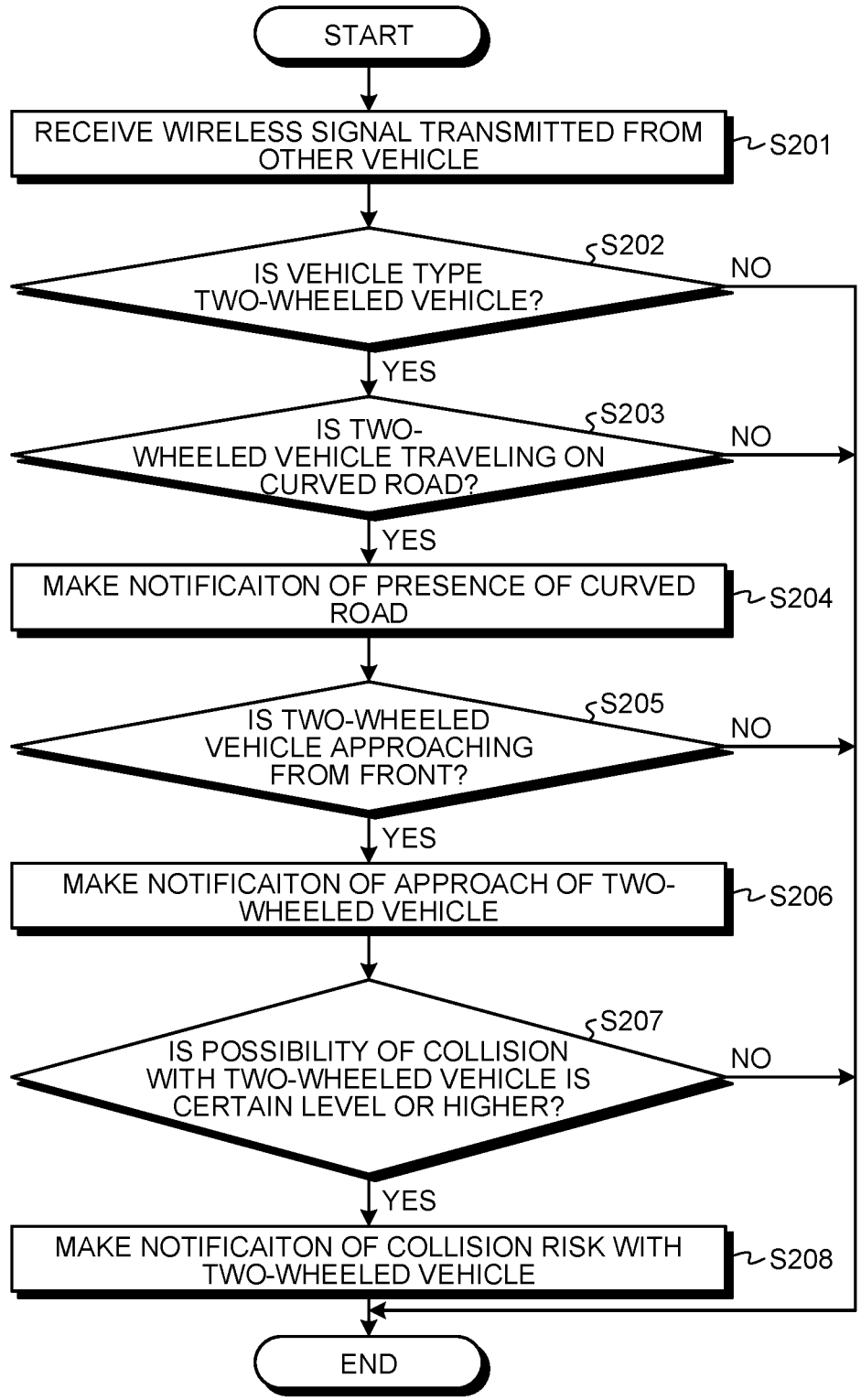
FIG. 8 is a flowchart illustrating another example of the flow of the driving assistance processing on the reception side executed by the driving assistance device according to the embodiment.
Figure 9:
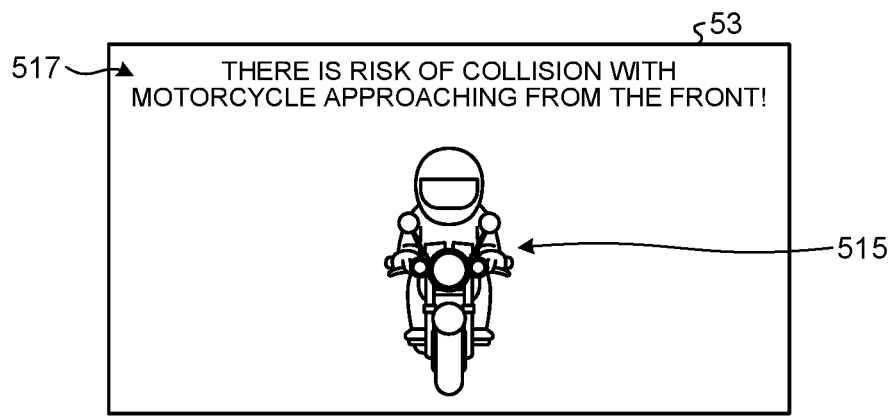
FIG. 9 is a diagram schematically illustrating an example of a notification screen displayed on the display in the driving assistance processing on the reception side in FIG. 8.

FIG. 8 is a flowchart illustrating another example of the flow of the driving assistance processing on the reception side executed by the driving assistance device 10b according to the embodiment. FIG. 9 is a view schematically illustrating an example of a notification screen 53 displayed on the display 171 in the driving assistance processing on the reception side in FIG. 8. Here, differences from the driving assistance processing on the reception side according to the first embodiment of FIG. 6 will be mainly described.

After the second notification information 513 (warning) that notifies the driver of the approach of the two-wheeled vehicle is notified to the driver by the notification device (S206), the processor 11b of the driving assistance device 10b determines whether the possibility of collision with the two-wheeled vehicle is the certain level or higher (S207). When it is not determined that the possibility of collision with the two-wheeled vehicle is a certain level or higher (S207: No), the flow of FIG. 8 ends.

On the other hand, when it is determined that the possibility of collision with the two-wheeled vehicle is a certain level or higher (S207: Yes), the device interface 17 of the driving assistance device 10b notifies the driver of third notification information 517 (warning) that notifies the driver of the risk of collision with the two-wheeled vehicle by the notification device (S208).

For example, as illustrated in FIG. 9, when it is determined that the possibility of collision with the two-wheeled vehicle traveling on the curved road CR is the certain level or higher, the device interface 17 of the driving assistance device 10b notifies the driver of the third notification information 517 indicating that "there is a risk of collision with a motorcycle approaching from the front!" by causing the display 171 to display the notification screen 53 including the third notification information 517. Additionally, as illustrated in FIG. 9, the notification screen 53 may include the icon 515 indicating the presence of the motorcycle. It is noted that the notification screen 53 displayed in this step may include at least one of the first notification information 511 and the second notification information 513 described above.

For example, when it is determined that the possibility of collision with the two-wheeled vehicle traveling on the curved road CR is a certain level or higher, the device interface 17 of the driving assistance device 10b notifies the driver of a sound indicating the third notification information 517 indicating that "there is a risk of collision with a motorcycle approaching from the front!" by causing the speaker 173 to output the sound. It is noted that the device interface 17 may output, by sound, at least one of the first notification information 511 and the third notification information 517 described above together with the second notification information 513.

As described above, in the driving assistance system 1 according to the present embodiment, the processor 11b of the driving assistance device 10b is configured to cause the device interface 17 (second output circuit) to output a predetermined notification based on at least the position of the first vehicle 3a, the speed of the first vehicle 3a, the lean angle θ of the first vehicle 3a, the position of the second vehicle 3b, and the speed of the second vehicle 3b when the possibility of collision between the first vehicle 3a and the second vehicle 3b is equal to or greater than a certain level. According to this configuration, it is possible to warn the driver of the second vehicle 3b about the possibility of collision with the oncoming vehicle (first vehicle 3a).

As an example, the processor 11b of the driving assistance device 10b is configured to predict the predicted traveling trajectory of the first vehicle 3a based on at least the position, the speed, and the lean angle θ of the first vehicle 3a, and to determine the possibility of collision between the first vehicle 3a and the second vehicle 3b based on the predicted traveling trajectory of the first vehicle 3a. According to this configuration, the determination accuracy of the possibility of collision between the first vehicle 3a and the second vehicle 3b can be improved.

As an example, the processor 11b of the driving assistance device 10b is configured to predict the predicted traveling trajectory of the second vehicle 3b based on at least the position and the speed of the second vehicle 3b, and to determine that the possibility of collision between the first vehicle 3a and the second vehicle 3b is a certain level or higher when the predicted traveling trajectory of the first vehicle 3a and the predicted traveling trajectory of the second vehicle 3b intersect each other. According to this configuration, the determination accuracy of the possibility of collision between the first vehicle 3a and the second vehicle 3b can be further improved.

Third Embodiment

In the present embodiment, a description will be given as to another example of the driving assistance system 1 configured to further determine the possibility of collision between the two-wheeled vehicle (first vehicle 3a) traveling on the curved road ahead and the own vehicle (second vehicle 3b). In the present embodiment, differences from the second embodiment will be mainly described.

As an example, a memory 12b of the driving assistance device 10b according to the present embodiment stores road information including at least information on the traveling lane of the second vehicle 3b. For example, the processor 11b is configured to acquire the information on the traveling lane of the second vehicle 3b from road information based on the position information of the second vehicle 3b, and to cause the memory 12 to store the acquired information. The road information may be stored in the memory 12 or may be stored in the memory of the car navigation device of the second vehicle 3b. In addition, the processor 11 may acquire the information on the traveling lane of the second vehicle 3b from road information stored in a server device provided on a network such as the Internet.

As an example, the processor 11b of the driving assistance device 10b according to the present embodiment is configured to predict a predicted traveling trajectory of the first vehicle 3a based on at least the position, the speed, and the lean angle θ of the first vehicle 3a. On the other hand, unlike the second embodiment, the processor 11b may not be configured to predict the predicted traveling trajectory of the second vehicle 3b.

As an example, the processor 11b of the driving assistance device 10b according to the present embodiment is configured to determine the possibility of collision between the first vehicle 3a and the second vehicle 3b based on the predicted traveling trajectory of the first vehicle 3a. Specifically, the processor 11b is configured to determine that the possibility of collision between the first vehicle 3a and the second vehicle 3b is a certain level or higher when the predicted traveling trajectory of the first vehicle 3a runs off into the traveling lane of the second vehicle 3b. According to this configuration, since it is determined whether the second vehicle 3b runs off into the traveling lane of the own vehicle, it is possible to more accurately determine the possibility of collision between the first vehicle 3a and the second vehicle 3b.

It is noted that the processor 11b in the driving assistance device 10b may be configured to determine that the possibility of collision between the first vehicle 3a and the second vehicle 3b is a certain level or higher when the predicted traveling trajectory of the first vehicle 3a approaches a range within a predetermined distance from the traveling lane of the second vehicle 3b.

It is noted that the technique according to the present embodiment can be combined with the driving assistance device 10b according to the second embodiment. That is, the driving assistance device 10b may be configured to determine the possibility of collision between the first vehicle 3a and the second vehicle 3b based on the predicted traveling trajectory of the first vehicle 3a, the predicted traveling trajectory of the second vehicle 3b, and the information on the traveling lane of the second vehicle 3b.

Fourth Embodiment

In the present embodiment, a description will be given as to the driving assistance system 1 configured to further determine the possibility of falling over of the two-wheeled vehicle (first vehicle 3a) traveling on the curved road ahead. In the present embodiment, differences from the second embodiment will be mainly described.

As an example, the processor 11b of the driving assistance device 10b according to the present embodiment is configured to determine whether the first vehicle 3a has fallen over based on at least the time series of the lean angle θ of the first vehicle 3a. Specifically, the processor 11b is configured to determine that the first vehicle 3a is a two-wheeled vehicle that has fallen over when the lean angle θ of the first vehicle 3a is continuously equal to or greater than a predetermined second threshold value for a time equal to or longer than a predetermined second time.

Here, the second time related to the detection of the falling over is longer than the first time related to the detection during traveling on the curved road described above. In addition, the second threshold value related to the detection of the falling over is an angle larger than the first threshold value related to the detection during traveling on the curved road described above. That is, the processor 11b is configured to determine that the first vehicle 3a has fallen over when the state in which the vehicle body 301 of the first vehicle 3a is inclined more than inclination assumed to travel on the curved road continues.

It is noted that the processor 11b of the driving assistance device 10b according to the present embodiment may be configured to determine that the first vehicle 3a has fallen over when the lean angle θ of the first vehicle 3a rapidly changes. As an example, the processor 11b may be configured to determine that the first vehicle 3a is a two-wheeled vehicle that has fallen over when the change amount of the lean angle θ of the first vehicle 3a is equal to or greater than a predetermined third threshold value. As an example, the processor 11b may be configured to determine that the first vehicle 3a is a two-wheeled vehicle that has fallen over when the change speed of the lean angle θ of the first vehicle 3a is equal to or greater than a predetermined fourth threshold value.

As an example, the processor 11b of the driving assistance device 10b according to the present embodiment is configured to notify the driver of the second vehicle 3b of fourth notification information indicating that there is a two-wheeled vehicle that has fallen over ahead by the notification device when it is determined that the first vehicle 3a has fallen over based on the time series of the lean angle θ.

As described above, since the driving assistance device 10b according to the present embodiment can detect that the two-wheeled vehicle (first vehicle 3a) has fallen over, it is possible to suppress a collision accident with the two-wheeled vehicle that has fallen over on the curved road.

According to the present disclosure, it is possible to suppress a collision accident on a curved road.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A driving assistance device configured to be mounted on a first vehicle, the driving assistance device comprising:
a first input circuit configured to receive a wireless signal, and further configured to receive at least a first position of the first vehicle and a first speed of the first vehicle; and
a first output circuit configured to output a notification to a driver of the first vehicle, wherein:
the wireless signal includes at least a second position of a second vehicle, a second speed of the second vehicle, and a lean angle of the second vehicle,
the wireless signal is configured to be transmitted from a wireless communication device mounted on the second vehicle including at least one wheel,
the wireless communication device includes, a second input circuit connecting to at least a lean angle detection circuit configured to detect a lean angle of the second vehicle with a traveling direction of the second vehicle as a rotation axis, and a second output circuit configured to repeatedly transmit the wireless signal including at least the second position of the second vehicle, the second speed of the second vehicle, and the lean angle of the second vehicle at time intervals, and
the first output circuit of the driving assistance device outputs the notification to the driver of the first vehicle when a possibility of collision between the first vehicle and the second vehicle is a certain level or higher based on at least the first position of the first vehicle, the first speed of the first vehicle, the second position of the second vehicle, the second speed of the second vehicle, and the lean angle of the second vehicle.

2. The driving assistance device according to claim 1, further comprising
at least one of a position detection circuit and a speed detection circuit, the position detection circuit configured to detect the first position of the first vehicle, the speed detection circuit configured to detect the first speed of the first vehicle.

3. The driving assistance device according to claim 1, further comprising
an antenna configured to receive the wireless signal as a radio wave, and connected to the first input circuit.

4. The driving assistance device according to claim 1, further comprising a control circuit configured to cause the first output circuit to output the notification when the possibility of collision between the first vehicle and the second vehicle is the certain level or higher based on at least the first position of the first vehicle, the first speed of the first vehicle, the lean angle of the second vehicle, the second position of the second vehicle, and the second speed of the second vehicle.

5. The driving assistance device according to claim 1, wherein
the first output circuit is configured to connect to a sound emission circuit configured to output a sound, and
the sound emission circuit is configured to output the notification as a sound.

6. The driving assistance device according to claim 1, wherein
the first output circuit is configured to connect to an image output circuit configured to output an image, and
the image output circuit is configured to output the notification as an image.

7. The driving assistance device according to claim 1, wherein the notification is a warning.

8. The driving assistance device according to claim 1, further comprising
a control circuit configured to determine whether the first vehicle is a two-wheeled vehicle traveling on a curved road, based on the lean angle of the second vehicle,
wherein the second output circuit notifies the driver of first notification information indicating that there is the curved road ahead, when it is determined that the second vehicle is the two-wheeled vehicle traveling on the curved road.

9. The driving assistance device according to claim 8, wherein
the control circuit determines whether the second vehicle approaches the first vehicle from a front, based on at least the second position of the second vehicle and the second speed of the second vehicle, and
the first output circuit notifies the driver of second notification information indicating that the two-wheeled vehicle approaches the first vehicle on the curved road, when it is determined that the second vehicle is the two-wheeled vehicle traveling on the curved road and approaches from the front.

10. The driving assistance device according to claim 1, further comprising
a control circuit configured to predict a predicted traveling trajectory of the second vehicle based on at least the second position of the first vehicle, the second speed of the second vehicle, and the lean angle of the second vehicle, and determine the possibility of the collision between the first vehicle and the second vehicle based on the predicted traveling trajectory of the second vehicle,
wherein the first output circuit notifies the driver of third notification information indicating that there is a risk of collision with the second vehicle when it is determined that the possibility of the collision between the first vehicle and the second vehicle is the certain level or higher based on the predicted traveling trajectory of the second vehicle.

11. The driving assistance device according to claim 10, wherein the control circuit predicts a predicted traveling trajectory of the first vehicle based on at least the first position of the first vehicle and the first speed of the first vehicle, and determines that the possibility of the collision between the first vehicle and the second vehicle is the certain level or higher, when the predicted traveling trajectory of the first vehicle and the predicted traveling trajectory of the second vehicle intersect each other.

12. The driving assistance device according to claim 10, further comprising
a memory configured to store road information including at least information on a traveling lane of the first vehicle,
wherein the control circuit determines that the possibility of the collision between the first vehicle and the second vehicle is the certain level or higher, when the predicted traveling trajectory of the second vehicle runs off into the traveling lane of the first vehicle.

13. The driving assistance device according to claim 8, wherein the control circuit determines that the second vehicle is the two-wheeled vehicle traveling on the curved road, when the lean angle of the second vehicle is continuously equal to or greater than a first threshold value for a time equal to or longer than a first time.

14. The driving assistance device according to claim 13, wherein each of the first threshold value and the first time is determined depending on the speed of the second vehicle.

15. The driving assistance device according to claim 13, wherein
the first output circuit notifies the driver of fourth notification information indicating that there is a two-wheeled vehicle that falls over ahead, when the lean angle of the first vehicle is continuously equal to or greater than a second threshold value for a time equal to or longer than a second time,
the second time is longer than the first time, and
the second threshold value is greater than the first threshold value.

16. The driving assistance device according to claim 1, wherein
the wireless signal is defined as a first wireless signal, and
the first output circuit is further configured to connect to an antenna, and is additionally configured to output, via the antenna, a second wireless signal including at least the first position of the first vehicle and the first speed of the first vehicle.

* * * * *